United States Patent
Phua et al.

(10) Patent No.: US 6,859,480 B2
(45) Date of Patent: Feb. 22, 2005

(54) TM:YAG LASER

(75) Inventors: Poh Boon Phua, Cambridge, MA (US); Kin Seng Lai, Singapore (SG); Rui Fen Wu, Singapore (SG); Yuan Liang Lim, Singapore (SG); Wei Pin Ernest Lau, Singapore (SG)

(73) Assignee: DSO National Laboratories, Singapore (SG)

( * ) Notice: Subject to any disclaimer, the term of this patent is extended or adjusted under 35 U.S.C. 154(b) by 0 days.

(21) Appl. No.: 09/845,945

(22) Filed: Apr. 30, 2001

(65) Prior Publication Data

US 2002/0159495 A1 Oct. 31, 2002

(51) Int. Cl.[7] .............................................. H01S 3/091
(52) U.S. Cl. ............................. 372/70; 372/72; 372/75
(58) Field of Search ............................... 372/70, 72, 75

(56) References Cited

U.S. PATENT DOCUMENTS

| | | | | |
|---|---|---|---|---|
| 5,182,759 A | * | 1/1993 | Anthon et al. | 372/72 |
| 5,289,482 A | * | 2/1994 | Esterowitz et al. | 372/68 |
| 5,651,019 A | * | 7/1997 | Goldberg et al. | 372/68 |
| 6,025,060 A | * | 2/2000 | Meissner | 438/455 |
| 6,400,495 B1 | * | 6/2002 | Zayhowski | 372/21 |

OTHER PUBLICATIONS

Hanna et al. "Efficient High–Power Continuous–Wave Operation of Monomode Tm–Doped Fibre Laser at 2 mm Pumped by Nd:YAG Laser at 1.064 mm" Sep. 28, 1989, Electronics Letters, vol. 25, 1365–1366.*

U.S. Appl. No. 09/963,181, filed Sep. 25, 2001, "An Apparatus for Generating Laser Radiation", 18 pages.
Bowman et al; "High Power Diode Pumped Micron Letters" SPIE vol. 1865 pp 156–163; 1993.
Shannon et al; "High Average Power Diode–Pumped Lasers Near 2 um" SPEI vol. 1865; pp 164–173.
Rustad et al; "Low Threshold Laser–Diode Side–Pumped TM:YAG and TM:Ho:YAG Lasers" IEEE Jnl of Sel Topics in Quatum Electronics vol. 3 Feb. 1997 8 pages.
Honea; "115–W TM:YAG Diode–Pumped Solid–State Laser"; IEEE Jnl of Sel Topics in Quatum Electonics vol. 33 Sep. 1997 9 pages.
Jackson "Efficient Gain–Switched Operation of a TM–Doped Silica Fiber Laser" EEE Jnl of Sel Topics in Quatum Electron. vol. 3 /1998 11 pages.
Bollig "2–W Ho:YAG Laser Intercavity Pumped by a Diode–Pumped Tm:YAG Laser" Optics Letters vol. 23 No 22 Nov. 1998 3 pages.
Rustad; Modeling of Laser–Pumped TM and HO Lasers Accounting for Upconversion and Bround State Depletion; IEEE Journal of Quant. El. V32, #9 Sep. 1996; 12 pages.

* cited by examiner

*Primary Examiner*—James Vannucci
*Assistant Examiner*—Cornelius H Jackson
(74) *Attorney, Agent, or Firm*—Ipsolon LLP

(57) ABSTRACT

A device for producing laser radiation having a wavelength of about 2 $\mu$m, the device comprising: a solid-state sample capable of producing lasing transitions corresponding to a wavelength of about 2 $\mu$m; and a source of pumping radiation having a wavelength of about 1 $\mu$m, the source being arranged so that at least some of the radiation produced thereby is absorbed by the solid-state sample, causing the solid-state sample to emit radiation having a wavelength of about 2 $\mu$m.

9 Claims, 1 Drawing Sheet

TM:YAG LASER

Figure 1:
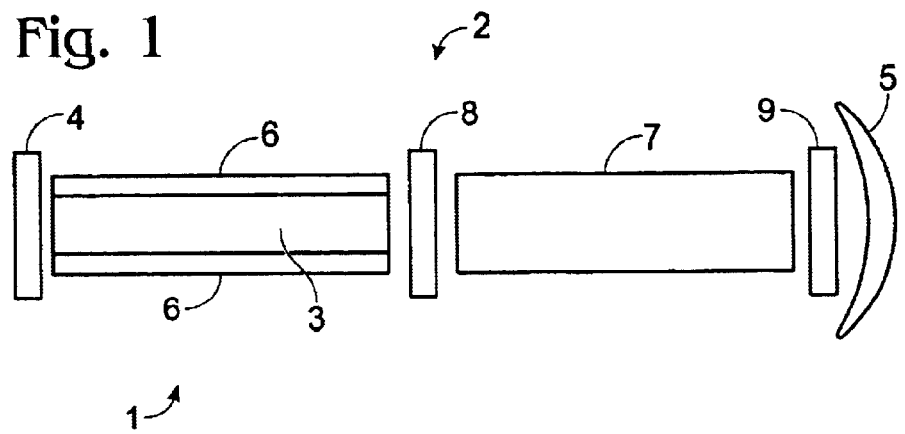

This invention relates to a Tm:YAG laser, and in particular to a high power room-temperature Tm:YAG laser.

Thulium-doped Yttrium-Aluminium-Garnet (Tm:YAG) lasers comprise a sample of Tm:YAG, which is typically provided in the form of a rod. Adjacent the rod, a source of energy is provided to "pump" the Tm:YAG, in order to populate the excited $^3F_4$ electronic state of the $Tm^{3+}$ ions contained within the Tm:YAG rod. It is the stimulated emission transition of $Tm^{3+}$ ions between the $^3F_4$ state and the $^3H_6$ state that produces photons of the desired wavelength, namely 2.02 $\mu$m, to form the laser beam.

Two mirrors are provided, one at either end of the Tm:YAG rod. Both of the mirrors are highly reflective to radiation having a wavelength in the region of 2 $\mu$m. Hence, photons having wavelengths of 2.02 $\mu$m produced in the Tm:YAG rod are reflected back and forth between the mirrors and repeatedly through the Tm:YAG rod. It will be understood that the mirrors and tile Tm:YAG sample constitute a resonant cavity.

One of the mirrors is typically constructed to have almost total reflectivity at 2 $\mu$m (for instance, 99.9% reflectivity), and the other of the mirrors is constructed to have a slightly lower reflectivity (for instance, 75–95% reflectivity). Hence, a portion of the 2.02 $\mu$m photons are allowed to escape from the resonant cavity through the mirror with the lower reflectivity. These escaping photons, which are collimated and coherent with one another, constitute the beam produced by the Tm:YAG laser.

Although the Tm:YAG laser finds many applications in various fields of technology, conventional techniques for pumping Tm:YAG lasers are cumbersome and expensive. For instance, most Tm:YAG lasers are pumped using radiation having a wavelength corresponding to the 785 nm absorption peak of the $Tm^{3+}$ ions (corresponding to the $^3H_6 \rightarrow ^3H_4$ electronic transition of $Tm^{3+}$) When pumping a Tm:YAG laser using radiation of this wavelength, it is conventional to provide arrays of appropriately-tuned laser diodes, positioned adjacent the Tm:YAG rod, to act as sources of the pumping radiation.

However, such arrays of high-power laser diodes are expensive, and technical difficulties have been encountered in arranging the arrays to pump the Tm:YAG rod sufficiently to result in a laser beam of useful intensity.

It is an object of the present invention to provide a Tm:YAG laser that alleviates at least some of the above drawbacks.

Accordingly, one aspect of the present invention provides a device for producing laser radiation having a wavelength of about 2 $\mu$m the device comprising: a solid-state sample capable of producing lasing transitions corresponding to a wavelength of about 2 $\mu$m; and a source of pumping radiation having a wavelength of about 1 $\mu$m the source being arranged so that at least some of the radiation produced thereby is absorbed by the solid-state sample, causing the solid-state sample to unit radiation having a wavelength of about 2 $\mu$m.

Advantageously, the solid-state sample is a Tm:YAG sample.

Preferably, the source of pumping radiation having a wavelength of about 1 $\mu$m comprises a 1 $\mu$m resonant cavity having the solid-state sample located substantially therein.

Conveniently, the resonant cavity comprises a Nd:YAG sample and a first pair of members that are substantially reflective to radiation had a wavelength of about 1 $\mu$m, the Nd:YAG sample being substantially interposed between the first pair of members.

Advantageously, the device comprises a source of pumping radiation for the Nd:YAG sample to stimulate the Nd:YAG sample to emit radiation having a wavelength of about 1 $\mu$m.

Preferably, the source of pumping radiation for the Nd:YAG sample comprises a plurality of arrays of laser diodes.

Alternatively, the source of pumping radiation for the Nd:YAG sample comprises a plurality of flashlamps.

Conveniently, the solid-state sample is substantially interposed between a second pair of members, at least one of which is substantially reflective to radiation having a wavelength of about 2 $\mu$m.

Advantageously, the second pair of members is located substantially within the source of radiation having a wavelength of about 1 $\mu$m.

Preferably, the device produces laser radiation having a wavelength of substantially 2.02 $\mu$m.

Conveniently, the source of radiation having a wavelength of about 1 $\mu$m is a source of radiation having a wavelength of substantially 1.064 $\mu$m.

Another aspect of the present invention provides a method of producing laser radiation having a wavelength of about 2 $\mu$m, the method comprising the steps of: providing a solid-state sample capable of producing lasing transitions corresponding to a wavelength of about 2 $\mu$m; and emitting pumping radiation having a wavelength of about 1 $\mu$m so that at least some of the radiation having a wavelength of about 1 $\mu$m is absorbed by the solid-state sample, causing the solid-state sample to emit radiation having a wavelength of about 2 $\mu$m.

Advantageously, the step of providing a solid-state sample comprises the step of providing a Tm:YAG sample.

Preferably, the step of emitting pumping radiation having a wavelength of about 1 $\mu$m comprises the step of providing a resonant cavity having the solid-state sample located substantially therein.

Conveniently, the step of providing a resonant cavity comprises the steps of: providing a Nd:YAG sample; and providing a first pair of members that are substantially reflective to radiation having a wavelength of about 1 $\mu$m, the Nd:YAG sample being substantially interposed between the first pair of members.

Advantageously, the method comprises the steps of providing a source of pumping radiation for the Nd:YAG sample; and stimulating the Nd:YAG sample with the pumping radiation to cause the Nd:YAG sample to emit radiation having a wavelength of about 1 $\mu$m.

Preferably, the source of pumping radiation for the ND:YAG sample comprises a plurality of arrays of laser diodes.

Alternatively, the source of pumping radiation for the Nd:YAG sample comprises a plurality of flashlamps.

Conveniently, the method further comprises the steps of: providing a second pair of members, at least one of which is substantially reflective to radiation having a wavelength of about 2 $\mu$m; and interposing the solid-state substantially between the second pair of members.

Advantageously, the method her comprises tie step of locating the second pair of members substantially within the source of radiation having a wavelength of about 1 $\mu$m.

Preferably, the method produces laser radiation having wavelength of substantially 2.02 $\mu$m.

Conveniently, the step of emitting pumping radiation having a wavelength of about 1 $\mu$m comprises the step of emitting pumping radiation having a wavelength of substantially 1.064 $\mu$m.

Figure 2:
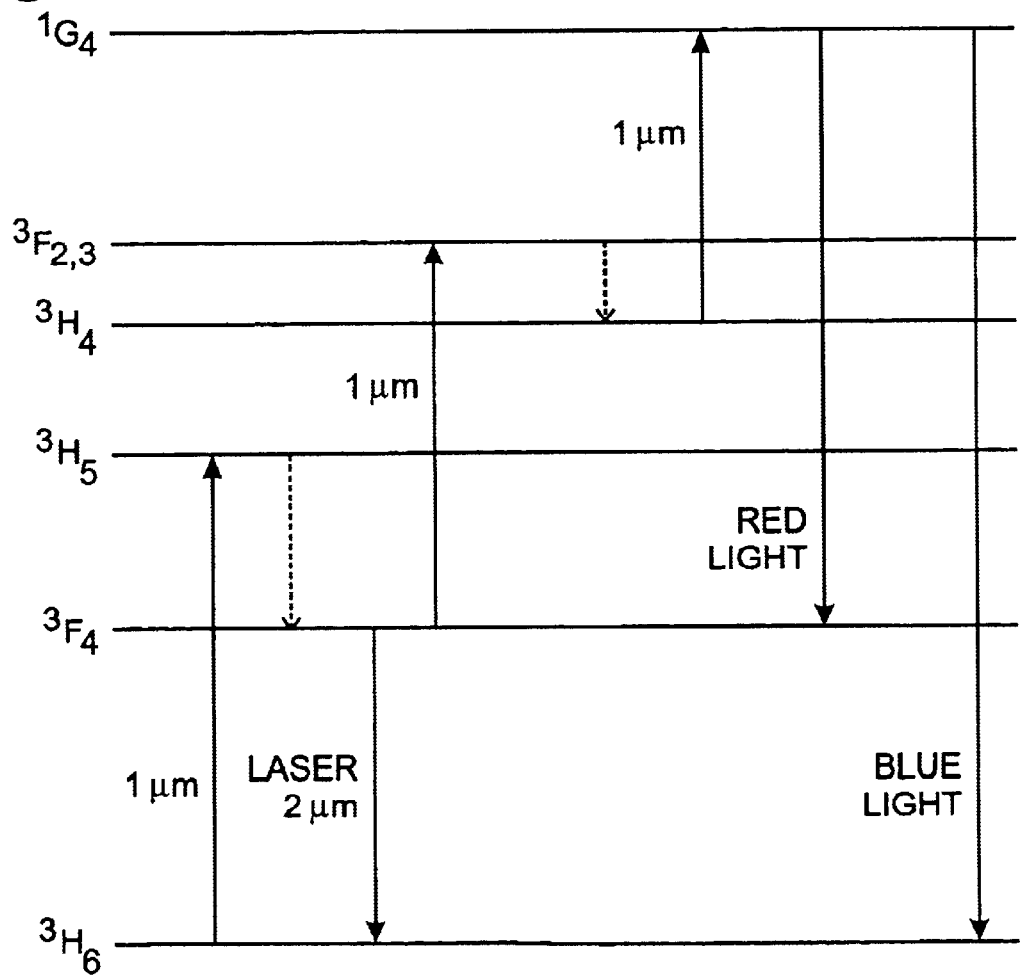

In order that the present invention may be more readily understood, embodiments thereof will now be described, by way of example, with reference to the accompanying drawings, in which:

FIG. 1 shows a schematic layout of a Tm:YAG laser embodying the present invention; and FIG. 2 shows a schematic diagram of electronic transitions within a sample of Tm:YAG for use in the Tm:YAG laser of FIG. 1.

Turning firstly to FIG. 1, a Tm:YAG laser 1 embodying the present invention comprises a Neodymium-doped Yttrium-Aluminium-Garnet (Nd:YAG) laser 2, having a Nd:YAG rod 3 and first and second mirrors 4, 5. Preferably, the Nd:YAG rod 3 has a diameter of 4 mm and a length of 105 mm, and is water-cooled. The Nd:YAG rod 3 is interposed between the first and second mirrors 4, 5, the first and second mirrors 4, 5 being located along the longitudinal axis of the Nd:YAG rod 3 and being arranged such that their reflective surfaces face toward the ends of the Nd:YAG rod 3.

The first mirror 4 is preferably substantially planar, and is located relatively close to a first end of the Nd:YAG rod 3. Advantageously, there is a gap in the region of 1 cm between the first end of the Nd:YAG rod 3 and the first mirror. The second mirror 5 is located substantially further away from a second end of the Nd:YAG rod 3, and advantageously a gap of around 15 cm is provided between these components. Preferably, the second mirror 5 is a concave mirror, having a radius of curvature of around 0.2 m, with the concave mirror surface being directed toward the second end of the Nd:YAG rod 3.

A source of pumping radiation is provided for the Nd:YAG rod 3. This pumping source could, for example, be a simple flash-lamp arrangement but in the present embodiment, preferably takes the form of a plurality of arrays 6 of laser diodes provided adjacent opposing sides of the Nd:YAG rod 3. Radiation emitted by the diode laser arrays 6 is absorbed by the Nd:YAG rod 3 and the absorption of this radiation by the Nd:YAG rod 3 pumps the Nd:YAG rod 3, thereby causing the Nd:YAG rod 3 to generate photons having wavelengths of 1.064 $\mu$m. The first and second mirrors 4, 5 are substantially reflective to radiation having a wavelength of 1.064 $\mu$m, having reflectivities of around 95% and 99% respectively in this wavelength range.

It will be appreciated that the Nd:YAG rod 3 and the first and second mirrors 4, 5 form a resonant cavity, in which resonant waves of radiation of a wavelength of 1.064 $\mu$m exist when the Nd:YAG laser 2 is active. As described above in relation to the Tm:YAG laser, a portion of the 1.064 $\mu$m photons will escape from Nd:YAG laser 2 through the first mirror 4, forming the laser beam produced by the Nd:YAG laser 2.

Nd:YAG lasers are common and relatively inexpensive, and most laser laboratories have a Nd:YAG laser.

In the space provided between the second end of the Nd:YAG rod 3 and the second moor 5, a rod 7 of Tm:YAG is provided. Preferably, the rod 7 of Tm:YAG is 105 mm long, comprises around 2%-doped Tm:YAG, and is directly water-cooled within an O-ring sealed-flow tube, the coolant temperature being in the region of 16–18° C. The Tm:YAG rod 7 is substantially coaxially aligned with the Nd:YAG rod 3. Located between the second end of the Nd:YAG rod 3 and the Tm:YAG rod 7 is a third mirror 8. The third mirror 8 is preferably substantially planar, and is almost totally transmissive to radiation having in the region of 1 $\mu$m, but almost totally reflective to radiation having a wavelength in the region 2 $\mu$m.

Located between the Tm:YAG rod 7 and the second mirror 5 is a fourth mirror 9, which is also preferably substantially planar, is almost totally transmissive to transmissive to radiation having a wavelength in the region of 1 $\mu$m, and is substantially reflective (although less reflective than the third mirror 8) to radiation having a wavelength in the region of 2 $\mu$m. The reflectivity of the fourth mirror 9 to radiation having a wavelength in the region of 2 $\mu$m is lower than that of the fourth mirror, and in a preferred embodiment of the present invention is between around 75% and around 95%.

In use of the TM:YAG laser 1, the arrays 6 of laser diodes in the Nd:YAG laser 2 cause, as discussed above, the Nd:YAG rod 3 to emit coherent photons having a wavelength of 1.064 $\mu$m, which form resonant waves in the resonant cavity in the space between the first and second mirrors 4, 5.

The absorption of radiation having a wavelength in the region of 1 $\mu$m by Tm:YAG is relatively low, and is in the region of 0.0078 cm$^{-1}$. For this reason, it has been conventionally believed that radiation of this wavelength is unsuitable for pumping Tm:YAG lasers, since the majority of photons having a wavelength of around 1 $\mu$m pass unabsorbed through the Tm:YAG rod of the Tm:YAG laser during a single pass.

However, due to the fact that the Tm:YAG rod 7 of the Tm:YAG laser 1 embodying the present invention is placed inside the resonant cavity of the Nd:YAG laser 2, the 1.064 $\mu$m photons that exist in the resonant cavity of the Nd:YAG laser 2 pass through the Tm:YAG rod 7 many times. Hence, it will be understood that, when the ND:YAG laser 2 produces high intra-cavity densities of 1.064 $\mu$m photons in the resonant cavity between the first and second mirrors 4, 5, a large number of the photons will be absorbed by the Tm:YAG rod 7.

As the Tm:YAG rod 7 absorbs the 1.064 $\mu$m photons produced by the Nd:YAG laser 2, the energy provided to the Tm:YAG rod 7 pumps the Tm:YAG rod 7, and causes the Tm:YAG rod 7 to emit photons having a wavelength of 2.02 $\mu$m, as discussed above. It will be understood that, due to the resonant cavity formed by the third and fourth mirrors 8, 9 provided at respective ends of the Tm:YAG rod 7, coherent 2.02 $\mu$m photons will be created between the third and fourth mirrors 8, 9.

Due to the reflectivity of the fourth mirror 9 to radiation in the 2 $\mu$m wavelength region being lower than that of the third mirror 8, a portion of the 2.02 $\mu$m photons produced in the space between the third and fourth mirrors 8, 9 will escape through the fourth mirror 9, and this portion of the 2.02 $\mu$m photons constitutes the laser beam produced by the Tm:YAG laser 1. The second mirror 4 is almost totally transmissive to radiation in the 2 $\mu$m wavelength region, and allows the beam to pass without significant attenuation.

From the above description, it will be appreciated that the pumping of the Tm:YAG rod 7 is performed by the Nd:YAG laser 2, and that this pumping is rendered effective by the location of the Tm:YAG rod 7 within the resonant cavity of the Nd:YAG laser 2. It will be understood that the use of a commonly-available Nd:YAG laser is a simpler and more cost-effective manner of pumping a Tm:YAG rod than the above-described method involving arrays of 785 nm laser diodes.

A further advantage of the Tm:YAG laser 1 of the present invention is that, due to the low absorption of radiation in the 1 $\mu$m range by Tm:YAG, the pumping distribution can be spread over a larger crystal length, and this can facilitate removal of heat from the Tm:YAG rod 7.

Referring to FIG. 2, a schematic diagram of the Stark energy levels of a $Tm^{3+}$ ion in the crystal field of YAG is shown. The absorption band between the terminal laser level of the $^3H_6$ manifold and the $^3H_5$ level is centered near 1.17 μm and hence the 1.064 μm radiation provided by the Nd:YAG laser 2 is detuned by approximately 110 nm from his absorption peak. In use of the Tm:YAG laser 1, an initial 1.064 μm photon is absorbed in exciting a $Tm^{3+}$ ion from the $^3H_6$ state to the $^3H_5$ state, and this is followed by a non-radiative relaxation of the electron into the $^3F_4$ state. The 2.02 μm laser photon is produced when the $Tm^{3+}$ ion is de-excited from a lower Stark component of the $^3F_4$ mold to an upper Stark component of the $^3H_6$ manifold.

As this terminal laser level is quite close to the ground state of the $Tm^{3+}$ ion, it is thermally populated at room temperature, and this hinders efficient operation of conventional Tm:YAG lasers at room temperature. As described above, conventional Tm:YAG lasers are pumped using radiation having a wavelength of around 785 nm. Pumping at 785 nm excites $Tm^{3+}$ ions directly from the ground state to the $^3F_4$ state, the lasing transition then taking place from the $^3F_4$ state to the $^3H_6$ state (an upper level) Since the ground state of the $^3H_6$ manifold is close to the lasing terminal state of $^3H_6$, the thermal population decreases the population inversion and thus the gain of $Tm^{3+}$ ions. Therefore room temperature operation is difficult. Indeed, in operation of conventional Tm:YAG lasers which are pumped by 785 nm wavelength radiation, the thermal population of the $^3H_6$ state at room temperature leads to the requirement to cool the Tm:YAG lasers to substantially below room temperature.

In contrast, the present invention employs radiation having a wavelength of around 1 μm to pump the Tm:YAG rod and, as described above, this leads to the excitation of $Tm^{3+}$ ions from the $^3H_6$ state to the $^3H_5$ state, which subsequently undergo a non-radiative relaxation to the $^3F_4$ state before being de-excited back to the $^3H_6$ state to produce photons of the desired wavelength, namely around 2 μm.

Despite the difficulty of pumping Tm:YAG for room temperature operation, the present invention enables operation of Tm:YAG at room temperature due to the high intra-cavity density of the 1 μm pumping radiation. This allows significant savings in cost and complexity to be achieved in Tm:YAG lasers embodying the present invention.

In summary, it will be appreciated that the present invention allows the construction of Tm:YAG lasers that demonstrate significant advantages over conventional Tm:YAG lasers, including low cost, high efficiency and simplicity. In particular, the positioning of a Tm:YAG rod within the resonant cavity of a Nd:YAG laser allows use of a piece of relatively inexpensive, commonly-available equipment to effectively pump a Tm:YAG laser.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A device a operatable for simultaneously producing laser radiation having two different wavelengths, the device comprising:
   a Tm:YAG sample; and
   a source of pumping radiation having a wavelength of about 1 μm, the source of pumping radiation comprising:
   a resonant cavity that includes a pair of first and second spaced apart members that are substantially reflective to radiation having a wavelength of about 1 μm, wherein, as compared to the second member, the member is selected to have a lower reflectively of wave lengths of about 1 μm;
   Nd:YAG sample interposed between the first and second members wherein a portion of pumping radiation having a wavelength of about 1 μm is emitted through the first member as a laser beam;
   a source of pumping radiation for the Nd:YAG sample;
   the resonant cavity also having the Tm:YAG sample located therein and between a second pair of members, one of which second pair of members is substantially reflective to radiation having a 2 μm wavelength, the Nd:YAG sample being arranged so that at least some of the radiation produced by the source is absorbed by the Tm:YAG sample, causing the Tm:YAG sample to emit a second laser beam with radiation having a wavelength of about 2 m.

2. A device according to claim 1, wherein the source of pumping radiation for the Nd:YAG sample is arranged along the length of the sample to pump radiation from a side of Nd:YAG sample.

3. A device according to claim 1, wherein the source of pumping radiation for the Nd:YAG sample comprises either a plurality of laser diodes or a plurality of flashlamps.

4. A device according to claim 1, wherein the second pair of members is located within the resonant cavity.

5. A device according to claim 1, wherein the second laser beam radiation has a wavelength of substantially 2.02 μm.

6. A device according to claim 1, wherein tho source of radiation having a wavelength of about 1 μm is a source of radiation having a wavelength of substantially 1.064 μm.

7. The device of claim 1 wherein the first and second members are selected to have, respectively, 95% and 99% reflectivities of a wavelength of about 1 μm.

8. A method of producing laser radiation, the method comprising the steps of:
   providing a Tm:YAG sample;
   providing a resonant cavity that includes a first pair of members that are substantially reflective to radiation having a wavelength of about 1 μm, and a Nd:YAG sample interposed between the first pair of members;
   selecting one of the first pair of members to reflect less of the radiation having a wavelength of about 1 μm than does the other one of the first pair of members;
   locating the Tm:YAG sample within the resonant cavity between the first pair of members and between a second pair of members wherein one of the second pair of members is substantially reflective to radiation having a 2 μm wavelength; and
   pumping the Nd:YAG sample for emitting radiation having a wavelength of about 1 μm within the resonant cavity so that at least some of the radiation having a wavelength of about 1 μm is absorbed by the Tm:YAG sample, causing the Tm:YAG sample to emit a first beam of radiation having a wavelength of about 2 μm, and so that a second beam of radiation having a wavelength of about 1 μm is emitted by the Nd:YAG sample.

9. The method Amendment of claim 8 wherein the selecting step includes selecting one of the first pair of members to reflect about 4% less of the radiation having a wavelength of about 1 μm that does the other one of the first pair of members.

* * * * *